United States Patent Office 2,880,246
Patented Mar. 31, 1959

2,880,246
PROCESS FOR THE CHLORINATION OF AROMATIC AND CYCLOALIPHATIC COMPOUNDS

Bruno Walach, Ingelheim (Rhine), and August Kottler and Heinz Scheffler, Biberach (Riss), Germany, assignors to C. H. Boehringer Sohn, Ingelheim (Rhine), Germany, a partnership No Drawing. Application January 14, 1955
Serial No. 481,974

Claims priority, application Germany January 15, 1954

11 Claims. (Cl. 260—650)

This invention relates to a process for chlorinating aromatic and cycloaliphatic compounds, and more particularly to a process for chlorinating such compounds with the aid of hexachloro-cyclohhexane or heptachloro-cyclohexane.

It is well known in industry that in the manufacture of the gamma isomer of hexachloro-cyclohexane, for example, other isomers of this compound are formed along with the gamma isomer. However, only the gamma isomer can be successfully used for such purposes as insecticides and the like, while the alpha, beta and delta isomers are virtually useless and are usually discarded. There is therefore a large economic loss each year because the alpha, beta and delta isomers of hexachloro-cyclohexane have heretofore been considered as useless, and have been discarded.

It is an object of the present invention to provide a process whereby the various isomers of hexachloro-cyclohexane or heptachloro-cyclohexane can be employed economically for the production of valuable compounds.

Another object of the present invention is to provide a process whereby the various isomers of hexachloro-cyclohexane or heptachloro-cyclohexane can be employed for the chlorination of aromatic and cycloaliphatic compounds.

Still another object of this invention is to provide a process whereby the various isomers of hexachloro-cyclohexane and heptachloro-cyclohexane can be partially dechlorinated and caused to release the chlorine atoms in the form of free chlorine rather than in the form of hydrochloric acid.

Other objects and advantages of our invention will become apparent as the description thereof proceeds.

We have found that, by heating the alpha, beta, gamma, or delta isomer of hexachloro-cyclohexane or heptachloro-cyclohexane, or various mixtures of such isomers to elevated temperatures between 200° C. and 600° C., preferably between 350° C. and 500° C., in the presence of a suitable catalyst, an aromatic or cycloaliphatic compound, and sometimes an excess of hydrochloric acid under pressure, the chlorinated cyclohexane will split off free chlorine rather than hydrochloric acid. The chlorine is immediately taken up by the aromatic or cycloaliphatic compound, forming valuable chlorinated aromatic or cycloaliphatic compounds, which may be readily separated from the reaction mass. The chlorinated cyclohexane thus acts as a chlorine donor and the aromatic or cycloaliphatic compound acts as a chlorine acceptor.

While the theory underlying the reaction in accordance with the present invention may be variously explained, it may be regarded as a reversal of the chlorinating reaction in accordance with the formula (I)

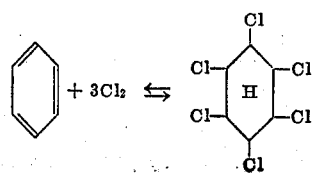

which is commonly used to produce hexachloro-cyclohexane.

However, on heating chlorinated cyclohexanes under conditions in accordance with our invention, another reaction is believed to take place which competes with the reaction illustrated by Formula I. This second reaction can be schematically shown as follows:

(II)

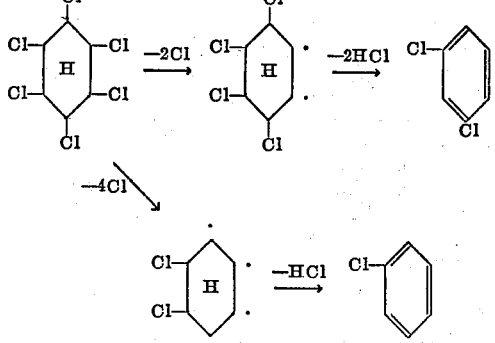

Thus, the chlorinated cyclohexane tends to split off first two or four atoms of chlorine, whereupon the dechlorinated cyclohexane becomes aromatized, splitting off one or two molecules of hydrochloric acid and forming dichloro-, monochloro-, trichloro- and some tetrachloro-benzenes. The formation of tetrachloro-benzenes can be explained by the action of the liberated chlorine upon trichloro-benzene.

The less desirable second stage of the reaction, as shown by Formula II, in which hydrochloric acid is split off, can be readily and almost completely suppressed by heating the chlorinated cyclohexane in an atmosphere of excess hydrochloric acid under pressure, thereby shifting the equilibrium toward the left and thus preventing almost completely the formation of hydrochloric acid, while favoring the splitting off of free chlorine.

It is well known that chlorinated cyclohexanes are capable of transformation into chlorinated aromatic compounds by a treatment with alkalis or by heating the cyclohexane to elevated temperatures, possibly in the presence of a suitable catalyst. However, this known transformation reaction releases only hydrochloric acid. Thus, for example, it is known that by treating hexachloro-cyclohexane with alkalis or by heating it to elevated temperatures three mols of hydrochloric acid are split off per mol of hexachloro-cyclohexane, and that the reaction product is a mixture of isomers of trichloro-benzene. No free chlorine is split off, and the reaction is therefore not adapted to the chlorination of aromatic or cycloaliphatic compounds.

The reaction in accordance with the present invention can be readily distinguished over the known reaction in that it is carried out in the presence of a chlorine acceptor, i.e. a compound capable of bonding chlorine as soon as it is formed, whereby the formation of hydrochloric acid is further suppressed, and the chlorinated cyclohexane becomes a chlorine donor rather than a hydrochloric acid donor.

Halogenated aromatic compounds do not undergo such a transformation reaction. Consequently, the formation of monochloro- and dichloro-benzene under the conditions of the reaction in accordance with our invention cannot be due to a dechlorination of trichloro-benzene.

Catalysts which are suitable for use in the chlorination of aromatic and cycloaliphatic compounds with the aid of hexachloro- or heptachloro-cyclohexanes are all types of naturally occurring ceramic minerals, pumice stone, aluminum oxides, magnesium silicates, calcium silicates, barium silicates, aluminum silicates, and Friedel-Crafts catalysts, such as ferric chloride, aluminum chloride, antimony pentachloride and the like. The activity of these catalysts in facilitating and accelerating the reaction in accordance with the present invention can be further increased by charging such catalysts with heavy metal ions, particularly with copper ions, zinc ions or cobalt ions, and/or by heating the catalysts to temperatures between 400° C. and 900° C.

As previously stated, the chlorinated cyclohexane becomes a chlorine donor only in the presence of compounds capable of binding chlorine, i.e. in the presence of chlorine acceptors. Examples of suitable chlorine acceptors for the purpose of this invention are saturated or unsaturated cycloaliphatic hydrocarbons such as cyclohexane, cyclohexene and the like, aromatic hydrocarbons such as benzene, toluene and the like, halogenated aromatic hydrocarbons such as monochloro-benzene, monobromo-benzene and the like, organic compounds containing hydroxyl or ether groups which transform into the corresponding unsaturated hydrocarbons at elevated temperatures, such as cyclohexanol, diethyl ether, and the like.

The chlorinated cyclohexane compound used as the starting material may be composed of a single isomer of the chlorinated cyclohexane, such as, for example, the alpha, beta, gamma or delta isomer of hexachloro-cyclohexane, or it may be a mixture of any two or more of these isomers.

While the process in accordance with the present invention can be carried out in the liquid or the gas phase, a preferred method comprises vaporizing the chlorinated cyclohexane and the chlorine acceptor to form a vapor mixture, and passing this mixture over the catalyst at temperatures between 200° C. and 600° C. Thus, for example, hexachloro-cyclohexane can be advantageously employed as a chlorinating agent for a chlorine acceptor by passing a vapor mixture of the hexachloro-cyclohexane and the chlorine acceptor over a suitable catalyst at a temperature between 350° C. and 500° C., employing from 0.5 to 12 mols of chlorine acceptor per mol of hexachloro-cyclohexane. The rate at which the vapor mixture is passed over the catalyst may range from 0.4 to 2.0 kg./hr./liter, but the preferred range is from 0.6 to 1.4 kg./hr./liter.

The following examples will further illustrate our invention and enable persons skilled in the art to understand the invention more completely. It is, however, understood that the present invention is not limited to the examples cited below.

Example I 437 gm. of $\alpha$-, $\beta$-, $\gamma$-, or $\delta$-hexachloro-cyclohexane, or a mixture of these isomers, were evaporated together with 244 gm. benzene, and the resulting vapor mixture was passed over a granulated copper-magnesium silicate catalyst heated to a temperature between 350 and 500° C. The volume-time rate at which the vapor was passed over the catalyst was about 1.0 to 1.4 kg./hr./liter. A liquid reaction product was recovered which was subjected to a fractional distillation and subsequently analyzed. It was found to contain the following amounts of chlorinated benzenes, the percentages being calculated on the amount of hexachloro-cyclohexane used: about 23% of the theoretical yield of monochloro-benzene, about 24% of the theoretical yield of dichloro-benzenes and about 30% of the theoretical yield of trichloro-benzenes. In addition, the liquid reaction product contained small amounts of unchlorinated benzene.

Similar results were obtained when the above copper-magnesium silicate catalyst was replaced by granulated pumice stone or granulated aluminum oxide.

Example II 437 gm. hexachloro-cyclohexane were evaporated with 200 gm. monochloro-benzene, and the resulting vapor mixture was passed over a granulated copper-magnesium silicate catalyst which had previously been tempered at a temperature between 400° C. and 500° C. The rate at which the vapor mixture was passed over the catalyst was between 1.0 and 1.4 kg./hr./liter. The liquid reaction product produced thereby contained, in addition to untransformed monochloro-benzene, about 47% of the theoretical yield of dichloro-benzenes and about 57% of the theoretical yield of trichloro-benzenes. These percentages were calculated on the basis of the amount of hexachloro-cyclohexane used.

Example III 437 gm. hexachloro-cyclohexane and 164 gm. cyclohexene were evaporated together to form a vapor mixture, and this mixture was passed over a granulated copper-barium silicate catalyst at 350 to 370° C. and at a rate of about 1.0 to 1.4 kg./hr./liter. A liquid reaction product was formed which, in addition to untransformed cyclohexene, contained the following amounts of chlorinated benzenes, the percentages being calculated on the basis of the amount of hexachloro-cyclohexane used: about 41% of the theoretical yield of monochloro-benzene, about 17% of the theoretical yield of dichloro-benzenes, and about 18% of the theoretical yield of trichloro-benzenes.

Example IV 728 gm. $\alpha$-hexachloro-cyclohexane and 785 gm. monobromo-benzene were evaporated together and the vapor mixture resulting therefrom was passed over a granulated copper-magnesium silicate catalyst at 500° C., at a rate of 1.1 kg./hr./liter. The liquid reaction product contained, in addition to untransformed monobromo-benzene, the following amounts of chlorinated benzenes, the percentages being calculated on the basis of the amount of hexachloro-cyclohexane used: 78.5% of the theoretical yield of monochloro-benzene, 12.0% of the theoretical yield of dichloro-benzenes, and 19.5% of the theoretical yield of monochloro-monobromo-benzene.

Example V 325 gm. $\gamma$-heptachloro-cyclohexane having a melting point of 86° C., or an equal amount of a mixture of the gamma isomer with other isomers of heptachloro-cyclohexane, were vaporized together with 244 gm. benzene, and the resulting vapor mixture was passed over a copper-magnesium silicate catalyst at a temperature between 350° C. and 500° C. at a rate of 1.0 to 1.4 kg./hr./liter. The liquid reaction product formed thereby contained, in addition to untransformed benzene, the following amounts of chlorinated benzenes: 20% monochloro-benzene, 33% dichloro-benzenes, and 40% trichloro-benzenes.

Example VI 291 gm. of $\alpha$-, $\gamma$-, or $\delta$-hexachloro-cyclohexane, or an equal amount of a mixture of two or more of these isomers, were vaporized together with 600 gm. benzene, and the resulting vapor mixture was passed over a copper-magnesium silicate catalyst at a temperature and the rate described in Example I. The reaction was carried out in the presence of excess hydrochloric acid at a pressure of 2 atmospheres gauge. The liquid reaction mixture obtained thereby weighed 123 gm. and contained, in addition to untransformed benzene, the following amounts of chlorinated benzenes: 63% monochloro-benzene, 25% dichloro-benzene, and 12% trichloro-benzene.

Example VII 582 gm. $\alpha$-, $\beta$-, $\gamma$-, or $\delta$-hexachloro-cyclohexane, or an equal amount of a mixture of two or more of these isomers, were heated for a few hours at 200° C. in an autoclave together with 800 gm. benzene in the presence of 0.1 to 5.0% by weight of a chlorinating catalyst such as ferric chloride or antimony pentachloride, and in the presence of hydrochloric acid at a pressure of 2 atmospheres gauge. The pressure was maintained at this level by bleeding off small amounts of hydrochloric acid as they are formed by the reaction. The liquid reaction product produced thereby contains, in addition to untransformed benzene, the following amounts of chlorinated benzenes: 88% monochloro-benzene, 8% dichlorobenzenes and 2% trichlorobenzenes.

Example VIII 392 gm. α-hexachloro-cyclohexane and 208 gm. diphenyl (molar ratio 1:1) were evaporated together and the vapor mixture was passed over a granulated copper-magnesium silicate catalyst (CuO·9MgO·27SiO$_2$), which had been tempered at 1100° C. before use, at a temperature of 400° C. to 500° C. and at a rate of 0.75 kg./hr./liter. The granules of catalyst had diameters of 5–6 mm. The reaction product was found to contain, in addition to untransformed diphenyl and monochloro-diphenyl, 18% of the theoretical yield of monochloro-benzene, 17.4% of the theoretical yield of dichloro-benzene and 39.5% of the theoretical yield of trichloro-benzene. The above percentages were calculated on a basis of the amount of α-hexachloro-cyclohexane used.

Example IX 437 gm. α-hexachloro-cyclohexane were evaporated together with 252 gm. cyclohexane (molar ratio 1:2) and the resulting vapor mixture was passed over granulated aluminum oxide, which had been heated to 700° C. prior to use, at a temperature of 350–370° C. The reaction product formed thereby yields, in addition to untransformed cyclohexane, 26% of the theoretical yield of monochloro-benzene, 30% of the theoretical yield of dichloro-benzene, and 32% of the theoretical yield of trichloro-benzene. The above percentages were calculated on a basis of the amount of α-hexachloro-cyclohexane used.

Example X

The reactants of Example I were evaporated and passed over a copper-magnesium silicate catalyst as described in that example, but the catalyst was tempered at 100° C. prior to use, the reaction temperature was increased to between 390 and 430° C., and the rate of flow of the vapor mixture was lowered to about 0.9 kg./hr./liter. The reaction product yields a mixture of chlorinated benzenes in an amount corresponding to from 100 to 110% of the theoretical yield, calculated on a basis of the amount of α-hexachloro-cyclohexane used.

While we have given certain specific embodiments of our invention, we wish it to be understood that the invention is not limited to these embodiments and that various changes and modifications can be made therein without departing from the spirit of our invention or the scope of the following claims.

We claim:

1. The process of chlorinating a cyclic compound selected from the group consisting of benzene, monobromo-benzene, monochloro-benzene, cyclohexane, cyclohexene and diphenyl, which comprises forming a vapor mixture consisting of a vaporized chlorinated cyclohexane selected from the group consisting of isomers of hexachloro-cyclohexane and isomers of heptachloro-cyclohexane and said cyclic compound in vapor form, the molar proportion of the components in said vapor mixture being from 0.5 to 12 mols of cyclic compound per mol of chlorinated cyclohexane, and passing said vapor mixture over a catalyst selected from the group consisting of pumice stone, ferric chloride, aluminum oxide, antimony pentachloride, copper-magnesium silicate and copper-barium silicate at a temperature between 200 and 600° C. and at a volume-time rate of from 0.4 to 2.0 kg./hr./liter.

2. The process of chlorinating benzene, which comprises forming a vapor mixture consisting of at least one vaporized isomer of hexachloro-cyclohexane and vaporized benzene in a molar ratio of from 0.5 to 12 mols benzene per mol of hexachloro-cyclohexane, and passing said vapor mixture over copper-magnesium silicate at a temperature between 350 and 500° C. and at a volume-time rate of from 1.0 to 1.4 kg./hr./liter.

3. The process of chlorinating monochloro-benzene, which comprises forming a vapor mixture consisting of at least one vaporized isomer of hexachloro-cyclohexane and vaporized monochloro-benzene in a molar ratio of from 0.5 to 12 mols monochloro-benzene per mol of hexachloro-cyclohexane, and passing said vapor mixture over copper-magnesium silicate at a temperature between 350 and 500° C. and at a volume-time rate of from 1.0 to 1.4 kg./hr./liter.

4. The process of producing chlorinated benzenes, which comprises forming a vapor mixture consisting of vaporized cyclohexene and at least one vaporized isomer of hexachlorocyclohexane in a molar ratio of from 0.5 to 12 mols cyclohexene per mol of hexachloro-hexane, and passing said vapor mixture over copper-barium silicate at a temperature between 350 to 370° C. and at a volume-time rate of from 1.0 to 1.4 kg./hr./liter.

5. The process of chlorinating monobromo-benzene, which comprises forming a vapor mixture consisting of vaporized monobromo-benzene and vaporized α-hexachloro-cyclohexane in a molar ratio of from 0.5 to 12 mols monobromo-benzene per mol α-hexachloro-cyclohexane, and passing said vapor mixture over copper-magnesium silicate at a temperature of 500° C. and at a volume-time rate of 1.1 kg./hr./liter.

6. The process of chlorinating benzene, which comprises forming a vapor mixture consisting of vaporized benzene and at least one vaporized isomer of heptachloro-cyclohexane in a molar ratio of from 0.5 to 12 mols benzene per mol of heptachloro-cyclohexane, and passing said vapor mixture over copper-magnesium silicate at a temperature between 350 and 500° C. and at a volume-time rate of from 1.0 to 1.4 kg./hr./liter.

7. The process of producing chlorinated benzenes, which comprises forming a vapor mixture consisting of vaporized diphenyl and vaporized α-hexachloro-cyclohexane in a molar ratio of from 0.5 to 12 mols diphenyl per mol of α-hexachloro-cyclohexane, and passing said vapor mixture over copper-magnesium silicate at a temperature between 400 and 450° C. and at a volume-time rate of about 0.75 kg./hr./liter.

8. The process of producing chlorinated benzene which comprises forming a vapor mixture consisting of vaporized cyclohexane and vaporized α-hexachloro-cyclohexane in a molar ratio of from 0.5 to 12 mols cyclohexane per mol of α-hexahydro-cyclohexane, and passing said vapor mixture over aluminum oxide at a temperature between 350 and 370° C. and at a volume-time rate of from 1.0 to 1.4 kg./hr./liter.

9. The process according to claim 3, wherein said copper-magnesium silicate had previously been tempered at a temperature between 400 and 500° C.

10. The process according to claim 7, wherein said copper-magnesium silicate had previously been tempered at a temperature of 1100° C.

11. The process according to claim 8, wherein said aluminum oxide had previously been tempered at a temperature of 700° C.

References Cited in the file of this patent

FOREIGN PATENTS 890,339     Germany  ---------------- Sept. 17, 1953